US005548369A

United States Patent [19]

Iijima

[11] Patent Number: 5,548,369
[45] Date of Patent: Aug. 20, 1996

[54] CAMERA

[75] Inventor: Ryunosuke Iijima, Kanagawa-ken, Japan

[73] Assignee: Canon Kabushiki Kaisha, Tokyo, Japan

[21] Appl. No.: 654,074

[22] Filed: Feb. 11, 1991

[30] Foreign Application Priority Data

Feb. 17, 1990 [JP] Japan ................................. 2-036720

[51] Int. Cl.⁶ ..................................... G03B 17/00
[52] U.S. Cl. .......................................... 354/286
[58] Field of Search ................................. 354/286, 289.1, 354/289.12, 289.11, 446, 455, 272; 348/345, 347

[56] References Cited

U.S. PATENT DOCUMENTS 4,400,072  8/1983  Suzuki et al. ....................... 354/227.1
4,733,258  3/1988  Kojima ................................ 354/286
4,758,854  7/1988  Saegusa .............................. 354/286
4,881,094  11/1989  Terui et al. ........................ 354/286
4,935,760  6/1990  Kojima ................................ 354/286
5,359,379  10/1994  Kohno et al. ...................... 354/286

OTHER PUBLICATIONS

Japanese Patent Abstract 59–126,522, Jul. 21, 1984.

Primary Examiner—David M. Gray
Attorney, Agent, or Firm—Robin, Blecker, Daley & Driscoll

[57] ABSTRACT

A camera system permitting mounting of an optical accessory in addition to a camera body and an interchangeable lens comprises: a diaphragm disposed within the interchangeable lens; a detecting part for detecting aperture information on a stopped down aperture obtained when the aperture of the diaphragm is stopped down; and a correction part which is arranged to correct the aperture information obtained by the detecting part when the optical accessory is mounted and to supply the corrected aperture information to the camera body.

46 Claims, 5 Drawing Sheets

WITHOUT OPTICAL ACCESSORY

| f \ F No. | 14 ~ 20 | 20 ~ 28 | 28 ~ 40 | 40 ~ 56 | 56 ~ 80 |
|---|---|---|---|---|---|
| 11 | 11 | 11 | 11 | 11 | 11 |
| 8.0 | 8.0 | 8.0 | 8.0 | 8.0 | 8.0 |
| 5.6 | 5.6 | 5.6 | 5.6 | 5.6 | 5.6 |
| 4.0 | 4.0 | 4.0 | 4.0 | 4.0 | 4.0 |
| 2.8 | 2.8 | 2.8 | 2.8 | 2.8 | 2.8 |
| 2.0 | 2.0 | 2.0 | 2.0 | 2.0 | 2.0 |
| 1.4 | 1.4 | 1.4 | 1.4 | 1.4 | 1.4 |

FIG.3(B)

TYPE 1 (2×)

| f \ F No. | 28 ~ 40 | 40 ~ 56 | 56 ~ 80 | 80 ~ 112 | 112 ~ 160 |
|---|---|---|---|---|---|
| 22 | 22 | 22 | 22 | 22 | 22 |
| 16 | 16 | 16 | 16 | 16 | 16 |
| 11 | 11 | 11 | 11 | 11 | 11 |
| 8.0 | 8.0 | 8.0 | 8.0 | 8.0 | 8.0 |
| 5.6 | 5.6 | 5.6 | 5.6 | 5.6 | 5.6 |
| 4.0 | 4.0 | 4.0 | 4.0 | 4.0 | 4.0 |
| 2.8 | 2.8 | 2.8 | 2.8 | 2.8 | 2.8 |

FIG.4

& nbsp;

CAMERA

BACKGROUND OF THE INVENTION

1. Field of the Invention

This invention relates to a camera arranged to permit an optical accessory to be mounted thereon.

2. Description of the Related Art

It has been practiced to design a camera system taking into consideration the use of such accessories as a telephoto conversion lens (hereinafter referred to as a tele-converter), etc. For example, the use of a tele-converter which increases the focal length of a photo-taking lens by two or 1.4 times is in great demand. A camera system, therefore, must be designed to permit data correction in anticipation of an extender to be mounted for that purpose. More specifically, in the case of a camera system of the kind performing automatic focusing (hereinafter referred to as AF) and automatic exposure control (hereinafter referred to as AE), information on the lens received by the camera body without the use of any extender must be adjusted and corrected when the extender is used. To meet this requirement, there have been proposed various lens information correcting methods. In one method, the lens information (about its focal length, its aperture value, etc.) is corrected within the extender. In another, the use of an extender is detected and the lens information is corrected as necessary within an interchangable lens.

However, the conventional camera system is arranged to correct the lens information obtained with the tele-converter mounted on the camera system on the assumption that the AF and AE actions are to be performed at a maximum aperture. The conventional camera system, therefore, has presented a problem that accurate control is hardly possible in cases where a video camera system is arranged to perform the AF and AE actions with the aperture in a state of having been stopped down.

SUMMARY OF THE INVENTION

One aspect of this invention lies in the provision of a camera system wherein data converting means is arranged to correct lens information by taking a stopped-down state of aperture also into consideration when an optical accessory is mounted either between a camera body and an interchangeable lens or at the fore end of the interchangeable lens.

The above and other aspects and features of the invention will become apparent from the following detailed description of embodiments thereof taken in conjunction with the accompanying drawings.

BRIEF DESCRIPTION OF THE DRAWINGS

FIGS. 3 (A) and 3(B) show encoder data.

DETAILED DESCRIPTION OF THE PREFERRED EMBODIMENTS

Figure 1:
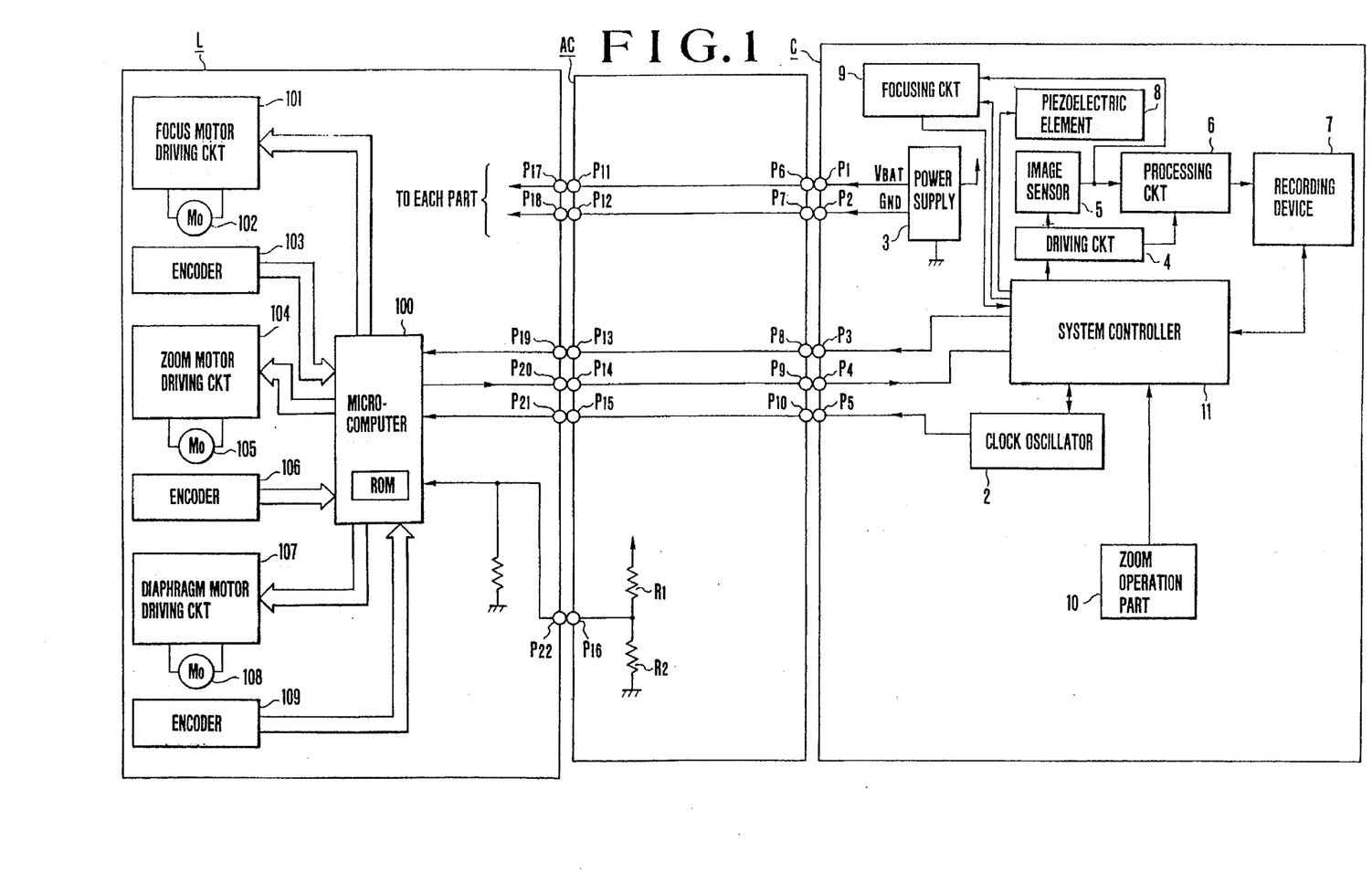
FIG. 1 is a diagram showing the whole arrangement of an embodiment of this invention.

FIG. 1 shows a camera system arranged according to this invention as an embodiment thereof. The illustration includes a camera body C; an interchangeable lens L; a tele-converter AC which is of a double magnifying power and employed as another optical accessory; a clock oscillator 2; and a power supply circuit 3 which is provided for power supply to each applicable circuit.

A driving circuit 4 is arranged to drive an image sensor 5 such as a CCD. The image sensor 5 is arranged to serve also as a sensor for focusing. A processing circuit 6 is arranged to perform a signal processing action on the output of the image sensor 5. A recording device 7 is arranged to record a processed signal output from the processing circuit 6. A piezoelectric element 8 is arranged to vibrate the image sensor 5. A focusing circuit 9 is arranged to determine the lens to be in a near-focus state or in a far-focus state on the basis of image information obtained when the image sensor 5 is vibrated in the direction of an optical axis. In focusing the interchangeable lens C, information on the lens such as its focal length, its aperture value is necessary. A zoom operation part 10 is arranged to generate a signal indicating a telephoto position or a wide-angle position of the lens resulting from a zooming operation, which is generally performed on an external operation switch. A system controller 11 is arranged to perform control over the whole camera system and includes a microcomputer.

In the interchangeable lens L, a microcomputer 100 is arranged within the lens L to control the operation of various actuators, to communicate with the system controller 11 which is disposed within the camera body C in such a way as to send the intrinsic and variable data relative to the lens. A driving circuit 101 is arranged to drive a focus motor 102. The focus motor 102 is provided as a drive source for a focus driving mechanism and is arranged to shift the position of a focusing lens (not shown) in the direction of the optical axis. An encoder 103 is provided for detecting the position of the focusing lens. A driving circuit 104 is arranged to drive a zoom motor 105. The zoom motor 105 is a drive source for a zoom driving mechanism and is arranged to shift the position of a zooming lens (not shown) in the direction of the optical axis. An encoder 106 is provided for detecting the position of the zooming lens. A driving circuit 107 is provided for driving a diaphragm motor 108. The diaphragm motor 108 (or a drive source called "meter") is of a type varying the aperture of the diaphragm by sliding two blades or of a type varying the aperture by rotating three or four blades. An encoder 109 is provided for detecting an aperture value and is arranged to produce an absolute data value of the aperture obtained by detecting the movement of a working member by means of a Hall element.

The double magnifying tele-converter AC which is employed as an optical accessory includes information output means which consists of resistors R1 and R2 and is arranged to provide the interchangeable lens L with information, in the form of a voltage, about the tele-converter's own optical characteristic indicating, for example, a changed (or adjusted) value of focal length and that of the aperture (F number).

Mount contacts P1 to P5 are disposed on the side of the camera body C. The mount contact P1 is provided for the power supply (high potential). The mount contact P2 is for the ground. The mount contacts P3 to P5 are provided for communication. Mount contacts P17 to P22 are disposed on the side of the lens L. The mount contact P17 is provided for the power supply and the mount contact P18 for the ground. The mount contacts P19, P20 and P21 are provided for communication. Further, the mount contact P22 is provided only on the side of the lens L for detection of mounting of an accessory such as the tele-converter and the kind of the accessory mounted. On the side of the camera body C, there is provided no mount contact in a position corresponding to this mount contact P22. Therefore, when the interchangeable lens L is mounted directly on the camera body C, the mount contact P22 does not come into contact with any of the mount contacts of the camera body.

The tele-converter AC is provided with mount contacts P6 to P10 which are arranged to come into contact with the mount contacts P1 to P5 of the camera body C and is also provided with mount contacts P11 to P16 which are arranged to come into contact with the mount contacts P17 to P22 of the lens.

As apparent from FIG. 1, the mount contacts P1 and P2 are connected to the power supply 3. The mount contacts P3 and P4 are connected to the system controller 11. The mount contact P5 is connected to the clock oscillator 2. The mount contacts P17 and P18 of the lens L come into contact with the mount contacts P1 and P2 of the camera body C upon completion of bayonet mounting of the interchangeable lens L on the camera body C. This allows the power to be supplied to electrical elements disposed within the lens L. In cases where the tele-converter AC which is employed as an accessory is interposed in between the lens L and the camera body C, the mount contacts P17 and P18 come into contact with the mount contacts P11 and P12.

The mount contacts P19 to P21 of the lens L are connected to the microcomputer 100 and, upon completion of lens mounting, come into contact with the mount contacts P3 to P5 in such a way as to permit communication between the lens L and the camera body C. In a case where the tele-converter AC is interposed in between the lens L and the camera body C, the mount contacts P19 to P21 come into contact with the mount contacts P13 to P15.

The mount contact P22 is connected to the microcomputer 100. This contact P22 has no corresponding mount contact on the side of the camera body C. Therefore, when the lens L is mounted directly on the camera body C, the mount contact P22 receives a ground level voltage to allow detection of the fact that no such accessory as the converter or the like is mounted on the camera body C. In a case where an accessory (or the tele-converter AC) is mounted and interposed in between the lens L and the camera body C, the mount contact P22 comes into contact with the mount contact P16 of the accessory to receive voltage information on the kind of the accessory mounted.

Figure 2A:
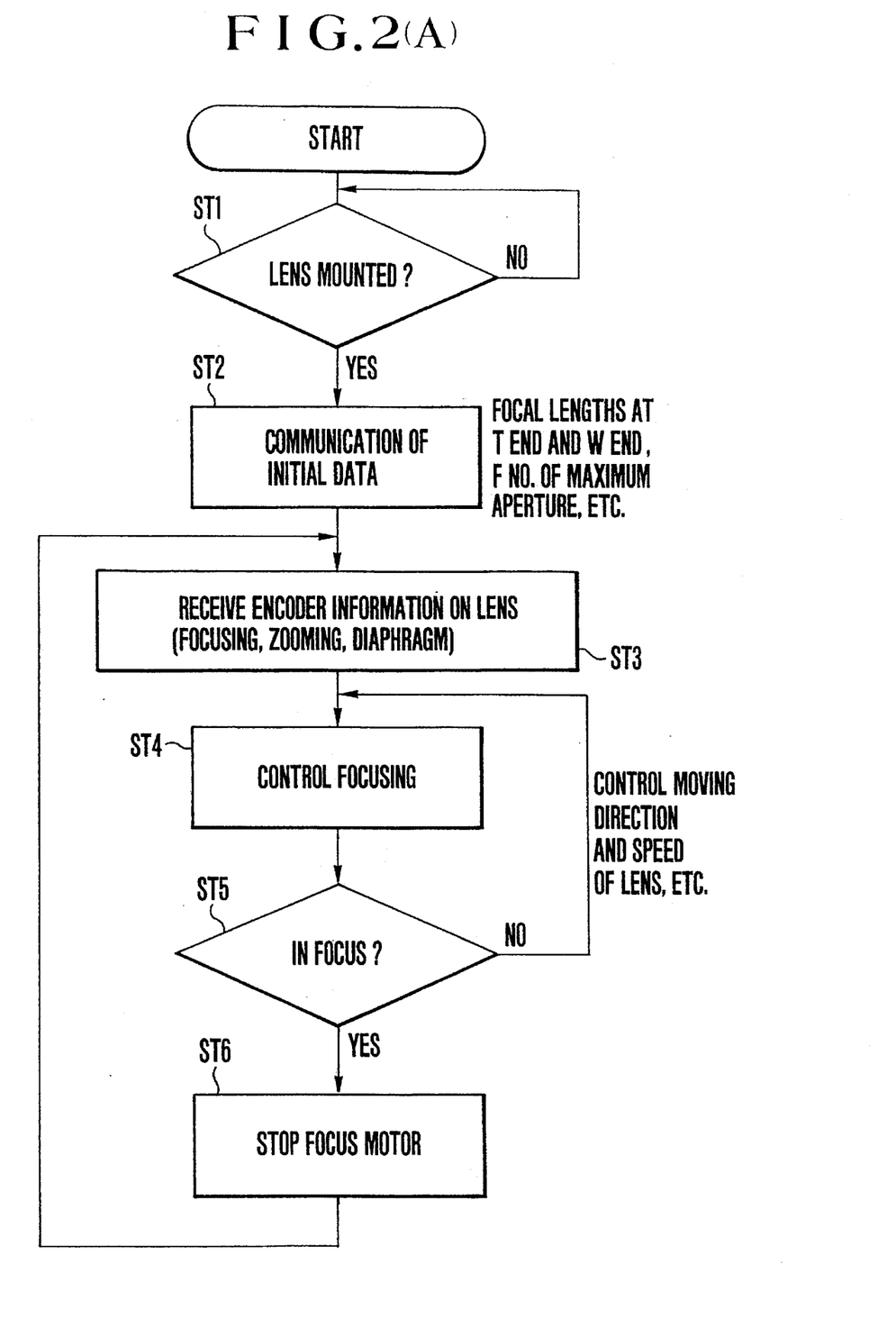
FIGS. 2(A) and 2(B) are flow charts showing the operation of the embodiment shown in FIG. 1.

Further, in the tele-converter AC, the mount contacts P6 to P10 are arranged to merely communicate with the mount contacts P11 to P16 respectively. The mount contact P16 is connected to resistors R1 and R2. Next, the operation of the camera system is described below with reference to FIGS. 2(A) and 2(B) which are flow charts:

FIG. 2(A) shows the flow of operation of the system controller 11 disposed within the camera body C. Referring to FIG. 2(A), a check is made at a step ST1 to find if the interchangeable lens L is mounted on the camera body C. If so, the flow proceeds to a step ST2. The lens-mounted state is detected in one of various methods including a simple method of using a mechanical switch; and another method in which the camera is arranged to periodically inquire as to whether the lens is mounted and to determine that the lens is mounted when a reply is received.

At the step ST2: Initial data communication is conducted to obtain initial data for the interchangeable lens L from the microcomputer 100 of the lens L. For example, the initial data to be thus received includes focal length values obtained at the telephoto end position and at the wide-angle end position of the lens; the F-number of a maximum aperture; the kind of a diaphragm mechanism: and the kind of a focusing mechanism. At a step ST3: Information is obtained from the encoders 103, 106 and 109 to find the current conditions including the state of the focusing lens, that of the zooming lens and that of the diaphragm.

At a step ST4: The focusing circuit 9 is caused to perform a focusing action. For this purpose, the system controller 11 controls the focusing action not merely on the basis of the current degree of defocus but also considers information on a focal length which is obtained from the encoder 106 and information on an aperture value which is obtained from the encoder 109. Then, data relative to the rotating direction and speed of the focusing motor 102, etc. is sent to the microcomputer 100 of the lens L. At a step ST5: The focusing action is allowed to continue until an in-focus state is determined to have been attained. At a step ST6: The rotation of the focus motor 102 is brought to a stop as the in-focus state has been detected.

Figure 2B:
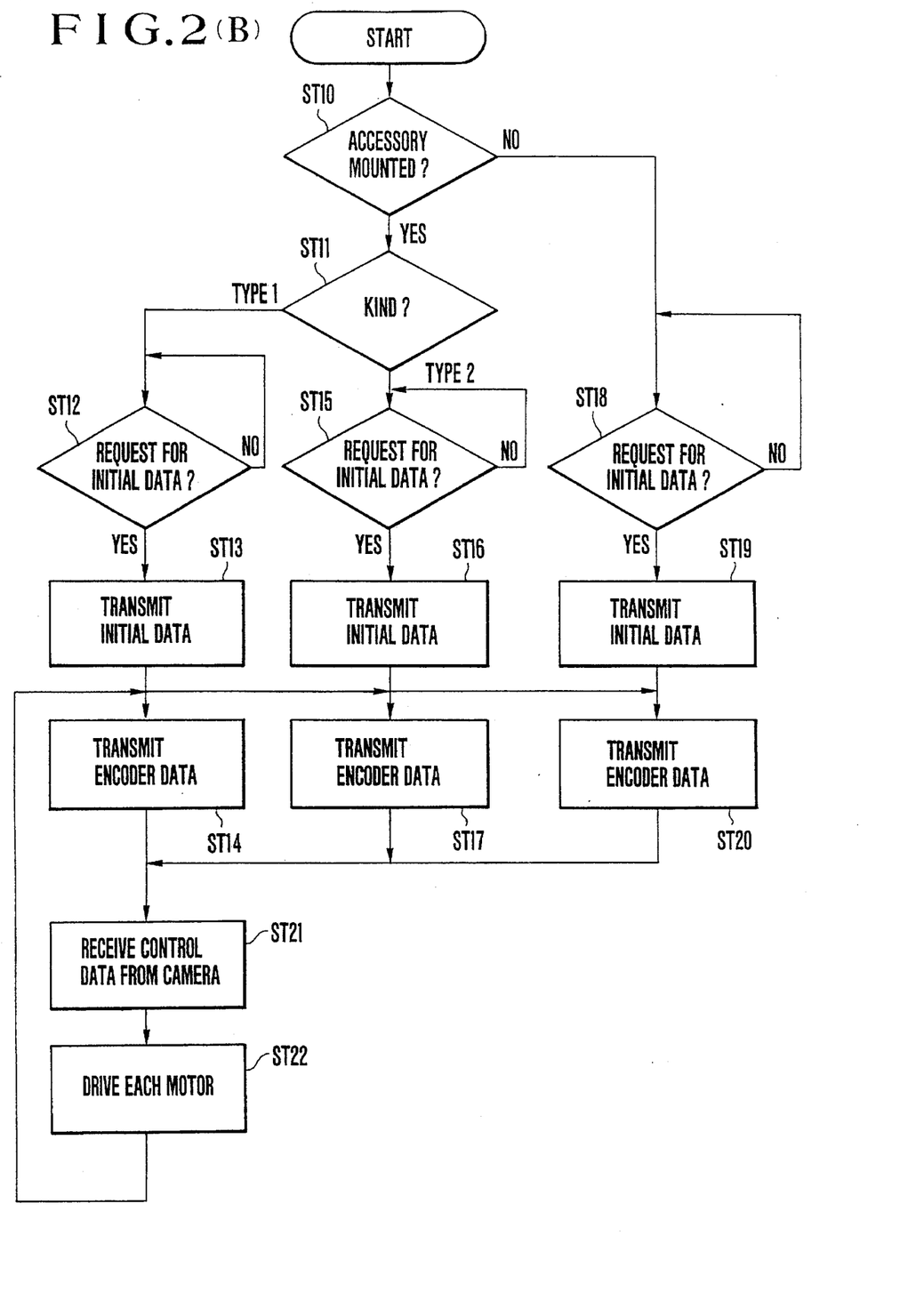

Next, referring to FIG. 2(B), the flow of operation of the microcomputer 100 disposed on the side of the lens L is described as follows: At a step ST10: A check is made for the presence or absence of an optical accessory such as the converter on the camera body. For this purpose, the microcomputer 100 checks voltage information obtained from the mount contact P22. If this voltage is found to be at a ground level, the accessory is determined to be absent and the flow comes to a step ST18. If the voltage information is found not at the ground level, the accessory is determined to be mounted on the camera body and the flow proceeds to a step ST11.

At the step ST11: A check is made for the kind of the optical accessory mounted on the camera body C. If the accessory is found to be of a type 1, the flow comes to a step ST12. If it is found to be of a type 2, the flow comes to a step ST15. In this instance, the flow of operation is described on the assumption that the optical accessories that can be mounted on the camera body C are divided into the type 1 and the type 2.

At the step ST12: A check is made to find if a request has been received from the system controller 11 of the camera body C for the initial data. If so, the flow comes to a step ST13. At the step ST13: The initial data which is changed according to their use of the optical accessory of the type 1 is sent to the system controller 11. Assuming that the type 1 is the tele-converter of a double magnifying power as in the case of FIG. 1, data indicating the changed value of focal length, that of the maximum aperture F-number, etc. is sent to the system controller 11 of the camera body C. Further, the initial data to be used with the optical accessories of the types 1 and 2 is stored beforehand in the memory ROM of the microcomputer 100 of the interchangeable lens L.

At a step ST14: The encoder data which has been changed by the use of the type 1 optical accessory is sent to the camera body C. More specifically, the data values of the encoders 103, 106 and 109 are not simply sent to the camera body as they are. Their values are replaced with applicable values stored in the memory ROM before the data is sent to the system controller of the camera body.

Figure 3A:
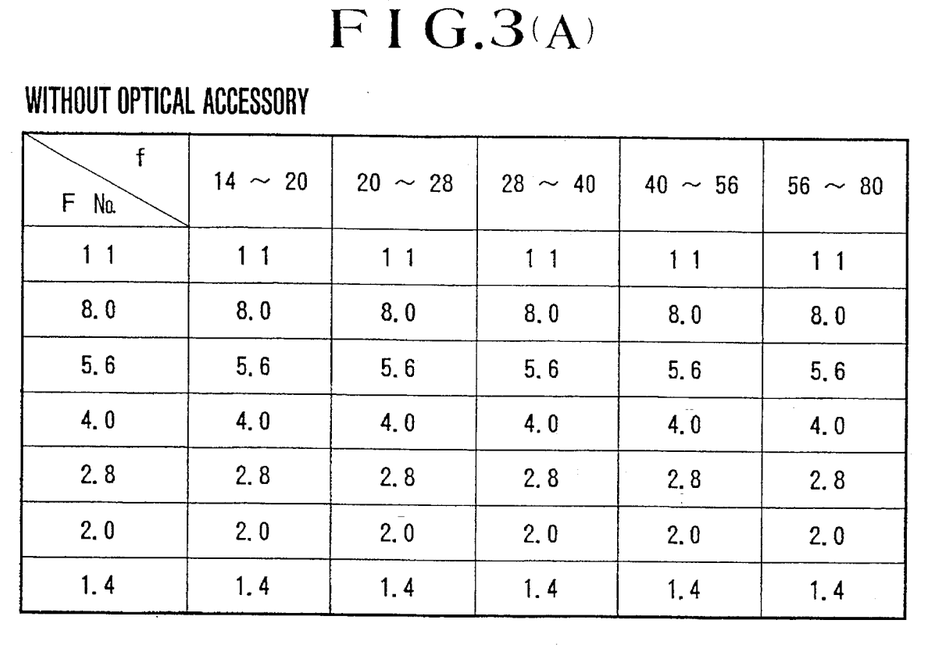
Figure 3B:
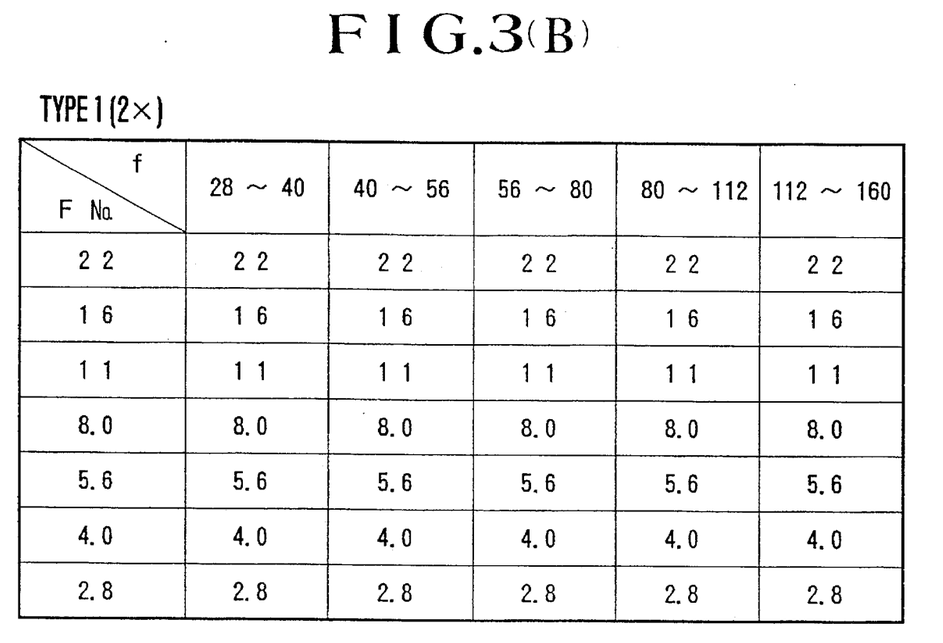

Assuming that the interchangeable lens L of FIG. 1 is a zoom lens having focal length values from 14 to 80 mm and the F-numbers from F 1.4 to F 11, the encoder data is replaced in the following manner: FIG. 3(A) shows the encoder data values to be obtained with no optical accessory mounted on the camera body. FIG. 3(B) shows the encoder data values applicable to a case where an optical accessory of the type 1 (the double magnifying tele-converter) is mounted on the camera body. As apparent from FIGS. 3(A)

and 3(B) which show actual numerical data values, this embodiment is arranged to send to the camera body not only the data of the maximum aperture value but also data for stopped-down aperture values obtained by replacing the data values with adjusted values as the encoder data. Further, the aperture values which are shown as the encoder data in FIG. 3(B) are obtained by simply multiplying the normal aperture values by 2 for the use of a standard tele-converter of a double magnifying power. In cases where some close-up ring or a special converter is used, however, the aperture value varies in a complex manner.

Steps ST15 to ST17: With the request for the initial data received from the camera body like in the case of the steps ST12 to ST14 mentioned above, the initial data is sent to the camera body with the type 2 optical accessory mounted on the camera body. Further, after that, the data of each encoder is replaced with applicable data stored by the memory ROM within the microcomputer 100 and the replacement data is also sent to the camera body.

At a step ST18: A check is made to find if a request for the initial data is received from the system controller 11 of the camera body. If so, the flow comes to a step ST19. At the step ST19: Since no optical accessory is mounted on the camera body in this instance, the intrinsic initial data of the interchangeable lens L is read out from the memory ROM of the microcomputer 100 and is sent to the camera body. At a step ST20: The encoder data for the interchangeable lens L is sent to the camera body without replacing it with any other data as no optical accessory is mounted on the camera body.

Step ST21: Control data is received from the system controller 11 of the camera body, the data indicating, for example, that the focusing lens is to be moved at a specific speed toward the nearest distance position thereof. Step ST22: In accordance with the control data, the motor 102, 105 or 108 is driven accordingly.

Figure 4:
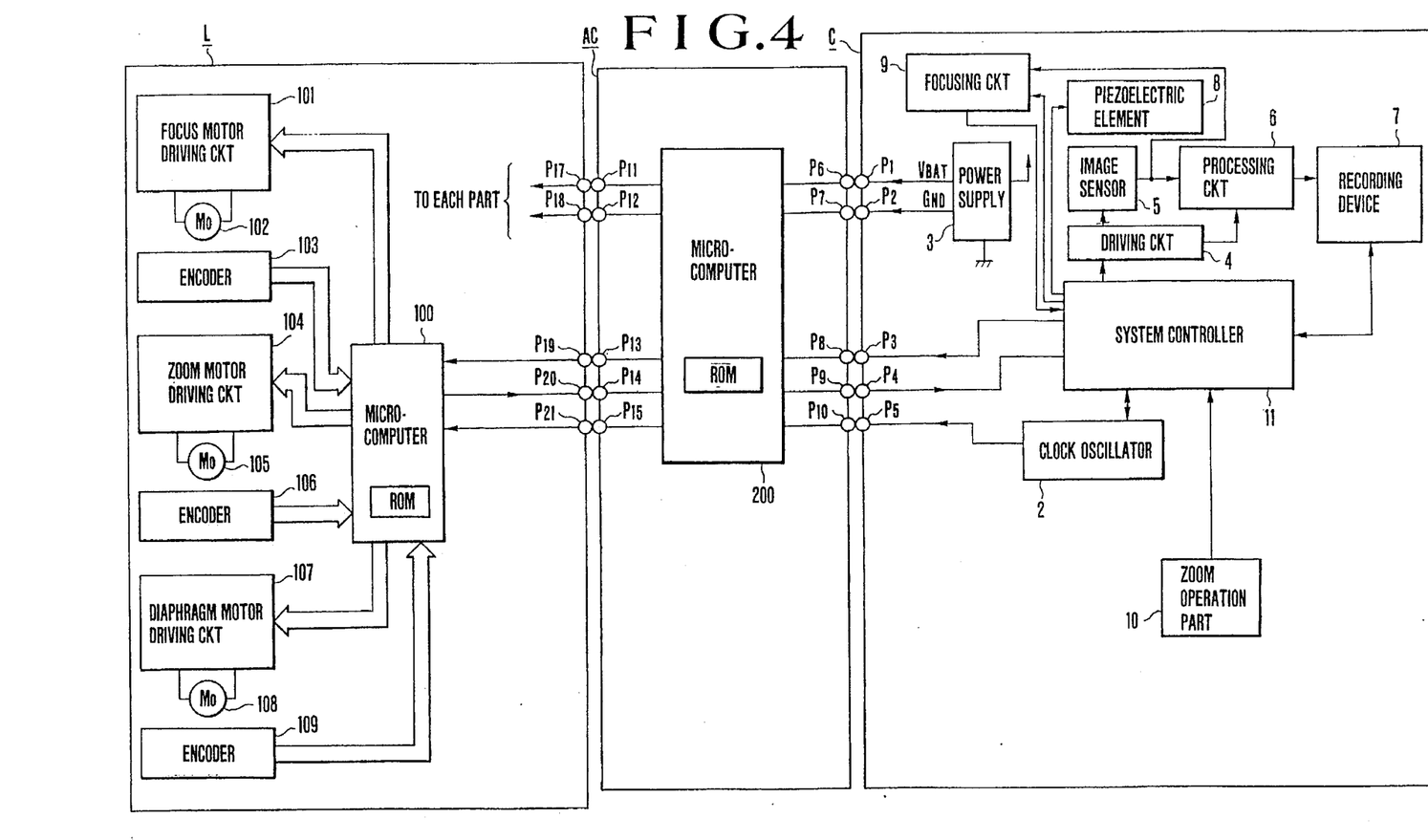
FIG. 4 is a diagram showing the whole arrangement of another embodiment of the invention.

Referring to FIG. 4, another embodiment of the invention is described as follows: In this case, a microcomputer 200 is included in the optical accessory AC. The initial data for the use of the optical accessory AC and the encoder data are replaced with other data by this microcomputer 200. Hence, in this case, the interchangeable lens L has no mount contact for detecting mounting of an optical accessory and the kind of the accessory.

The arrangement of the embodiments described in the foregoing enables a camera system of the kind permitting use of optical accessories such as a tele-converter, etc. to replace the aperture value data with data apposite to the optical accessory during the process of varying the aperture. The invented arrangement thus ensures accurate operations of the camera system.

What is claimed is:

1. A camera system capable of mounting an optical accessory in addition to a camera body and an interchangeable lens, comprising:
    a) a diaphragm disposed within said interchangeable lens, said interchangeable lens provided with an electrical contact used for detecting the kind of said optical accessory;
    b) detecting means for detecting aperture information corresponding to varying stopping down of said diaphragm;
    c) correction means for correcting said aperture information obtained by said detecting means when said optical accessory is mounted and for supplying the corrected aperture information to said camera body; and
    d) second detecting means for detecting the kind of said optical accessory.

2. A camera system according to claim 1, wherein said correction means is arranged to correct said aperture information obtained by said detecting means by using data stored in a memory.

3. A camera system according to claim 1, wherein said optical accessory is mounted between said camera body and said interchangeable lens.

4. A camera system according to claim 1, further comprising a focus control circuit arranged to operate by using said aperture information.

5. A camera system according to claim 1, wherein said correction means is arranged to vary a correction value to be used in correcting said aperture information according to the result of detection made by said second detecting means.

6. A camera system according to claim 1, wherein said correction means is disposed within said interchangeable lens.

7. A camera system according to claim 1, wherein said correction means is disposed within said optical accessory.

8. A camera system according to claim 1, wherein said optical accessory is a telephoto conversion lens.

9. A camera system according to claim 1, wherein said second detecting means is arranged to detect also mounting or nonmounting of said optical accessory.

10. A camera system according to claim 1, wherein said second detecting means is arranged to detect the kind of said optical accessory on the basis of voltage information.

11. A camera system according to claim 9, wherein said second detecting means is arranged to detect mounting or nonmounting of said optical accessory and the kind of said optical accessory on the basis of voltage information.

12. A camera system according to claim 9, wherein said electrical contact is also used for detecting mounting or nonmounting of said optical accessory.

13. A camera system having at least a camera body and an interchangeable lens, comprising:
    A) said camera body, including:
        A-1) focusing means for controlling focus by taking into consideration aperture information supplied from said interchangeable lens; and
        A-2) a first contact provided for communication with said interchangeable lens; and
    B) said interchangeable lens, including:
        B-1) a diaphragm having a variable aperture;
        B-2) detecting means for detecting aperture information obtained by stopping down said diaphragm;
        B-3) a second contact provided for communication with said camera body;
        B-4) a third contact provided for detection of mounting of an optical accessory; and
        B-5) a correction circuit arranged to correct said aperture information obtained by said detecting means when mounting of said optical accessory has been detected through information from said third contact, and to supply the corrected aperture information via said second contact to said camera body.

14. A camera system according to claim 13, wherein said correction circuit is arranged to correct said aperture information by using data stored in a memory.

15. A camera system according to claim 13, wherein said optical accessory is disposed between said camera body and said interchangeable lens.

16. A camera system according to claim 13, wherein said correction circuit is arranged to detect also the kind of said optical accessory through information from said third contact and to correct said aperture information in accordance with the kind thus detected.

17. A camera system according to claim 15, wherein, when said interchangeable lens is mounted on said camera body, said first contact is in contact with said second contact and said third contact is not in contact with said first contact.

18. A camera system according to claim 15, wherein, when said optical accessory is mounted between said camera body and said interchangeable lens, said first contact is in contact with a fourth contact provided on said optical accessory, said second contact is in contact with a fifth contact provided on said optical accessory, and said third contact is in contact with a sixth contact provided on said optical accessory.

19. A camera system according to claim 18, wherein said fourth and fifth contacts provided on said optical accessory are interconnected with each other, and said sixth contact is connected to an information supply circuit arranged to supply information on said optical accessory.

20. A camera system according to claim 18, wherein said fourth and fifth contacts provided on said optical accessory are interconnected with each other, and said sixth contact is connected to an information supply circuit arranged to supply information on the kind of said optical accessory.

21. A camera system according to claim 19, wherein said information supply circuit is arranged to supply said information in the form of a voltage.

22. A camera system according to claim 20, wherein said information supply circuit is arranged to supply said information in the form of a voltage.

23. A camera system according to claim 20, wherein said correction circuit is arranged to detect also the kind of said optical accessory through information from said third contact and to correct said aperture information in accordance with the kind thus detected.

24. A camera system according to claim 18, wherein said optical accessory is a telephoto conversion lens.

25. An optical accessory capable of being mounted between an interchangeable lens and a camera body comprising:
   a correction circuit arranged to correct aperture information corresponding to varying stopping down of a diaphragm in said interchangeable lens when said optical accessory is mounted, said diaphragm comprising a movable member defining an aperture and said aperture information being detected by a position of said movable member, and said correction circuit arranged to supply the corrected aperture information to said camera body, said correction circuit disposed within said optical accessory.

26. An optical accessory according to claim 25, wherein said correction circuit is arranged to correct said aperture information by using data stored in a memory.

27. An optical accessory according to claim 25, wherein said optical accessory is a telephoto conversion lens.

28. An interchangeable lens capable of being mounted on a camera body and capable of mounting an optical accessory thereon, comprising:
   a) first detecting means for detecting mounting of said optical accessory and including an electrical contact exclusively used for detection of mounting of said optical accessory;
   b) a diaphragm having a variable aperture;
   c) second detecting means for detecting aperture information corresponding to varying stopping down said diaphragm; and
   d) a correction circuit arranged to correct said aperture information obtained by said second detecting means when mounting of said optical accessory has been detected by said first detecting means.

29. An interchangeable lens according to claim 28, wherein said interchangeable lens is a zoom lens, and said aperture information on said diaphragm varies according to a change of the zoom ratio of said zoom lens.

30. An interchangeable lens according to claim 28, wherein said correction circuit is arranged to correct said aperture information by using data stored in a memory.

31. An interchangeable lens according to claim 29, wherein said correction circuit is arranged to correct said aperture information by using stored data every time the zoom ratio of said lens changes.

32. An interchangeable lens according to claim 28, wherein said first detecting means is arranged to detect not only mounting of said optical accessory but also the kind of said optical accessory mounted.

33. An interchangeable lens according to claim 32, wherein said correction circuit is arranged to correct said aperture information according to the kind of said optical accessory mounted.

34. An interchangeable lens according to claim 33, wherein said correction circuit is arranged to correct said aperture information according to the kind of said optical accessory on the basis of stored data.

35. An interchangeable lens according to claim 28, wherein said first detecting means is arranged to detect mounting or nonmounting of said optical accessory on the basis of voltage information.

36. An interchangeable lens according to claim 32, wherein said first detecting means is arranged to detect mounting or nonmounting of said optical accessory and the kind of said optical accessory on the basis of voltage information.

37. An interchangeable lens according to claim 32, wherein said electrical contact is also used for detection of the kind of said optical accessory.

38. A camera system capable of mounting an optical accessory in addition to a camera body and an interchangeable lens, comprising:
   a) a diaphragm disposed within said interchangeable lens, said diaphragm comprising a movable member defining an aperture;
   b) detecting means for detecting aperture information corresponding to varying stopping down of said diaphragm, said aperture information being detected by a position of said movable member; and
   c) correction means for correcting said aperture information obtained by said detecting means when said optical accessory is mounted and for supplying the corrected aperture information to said camera body, said correction means disposed within said optical accessory.

39. A camera system according to claim 38, wherein said correction means is arranged to correct said aperture information obtained by said detecting means by using data stored in a memory.

40. A camera system according to claim 38, wherein said optical accessory is mounted between said camera body and said interchangeable lens.

41. A camera system according to claim 38, further comprising a focus control circuit arranged to operate by using said aperture information.

42. A camera system according to claim 38, wherein said optical accessory is a telephoto conversion lens.

43. An optical accessory, capable of being mounted to a camera system in addition to a camera body and an interchangeable lens including a diaphragm and detecting means for detecting aperture information corresponding to varying stopping down of said diaphragm, said diaphragm and detecting means arranged in said interchangeable lens, said optical accessory comprising:

a) correction means for correcting said aperture information obtained by said detecting means when said optical accessory is mounted, said diaphragm comprising a movable member defining an aperture and said aperture information being detected by a position of said movable member, and said correction means arranged for supplying the corrected aperture information to said camera body, said correction means disposed within said optical accessory.

44. An optical accessory according to claim 43, wherein said correction means is arranged to correct said aperture information obtained by said detecting means by using data stored in a memory.

45. An optical accessory according to claim 43, wherein said optical accessory is mounted between said camera body and said interchangeable lens.

46. An optical accessory according to claim 43, wherein said optical accessory is a telephoto conversion lens.

* * * * *